(12) United States Patent
Oltman

(10) Patent No.: US 12,472,854 B2
(45) Date of Patent: Nov. 18, 2025

(54) CHILD RESTRAINT

(71) Applicant: Dorel Juvenile Group, Inc., Foxboro, MA (US)

(72) Inventor: Stephen B. Oltman, Hope, IN (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 177 days.

(21) Appl. No.: 18/372,320

(22) Filed: Sep. 25, 2023

(65) Prior Publication Data

US 2024/0101004 A1 Mar. 28, 2024

Related U.S. Application Data

(60) Provisional application No. 63/409,942, filed on Sep. 26, 2022.

(51) Int. Cl.
*B60N 2/28* (2006.01)

(52) U.S. Cl.
CPC ......... *B60N 2/2884* (2013.01); *B60N 2/2851* (2013.01); *B60N 2/2872* (2013.01)

(58) Field of Classification Search
CPC ... B60N 2/2884; B60N 2/2851; B60N 2/2872
USPC .............. 297/216.1, 216.12, 216.13, 216.14, 297/216.15, 216.16, 216.17, 216.18, 297/216.19, 216.2, 216.11
See application file for complete search history.

(56) References Cited

U.S. PATENT DOCUMENTS 5,468,047 A * 11/1995 Goor ................... B60N 2/2839
297/216.12

| | | |
|---|---|---|
| 7,234,771 B2 | 6/2007 | Nakhla |
| 7,717,506 B2 | 5/2010 | Amesar |
| 7,726,734 B2 | 6/2010 | Mahal |
| 7,744,154 B2 | 6/2010 | Marsden |
| 7,959,223 B2 | 6/2011 | Marsden |
| 8,205,940 B2 | 6/2012 | Mahal |
| 8,690,237 B2 | 4/2014 | Allen |
| 8,931,836 B2 | 1/2015 | Cheng |
| 9,211,820 B2 | 12/2015 | Allen |
| 9,221,366 B2 | 12/2015 | Oltman |
| 9,908,444 B2 | 3/2018 | Haas |
| 9,950,649 B2 | 4/2018 | Pleiman |
| 10,118,510 B2 | 11/2018 | Mcroberts |
| 10,988,057 B2 | 4/2021 | Maciejczyk |
| 11,247,588 B2 | 2/2022 | Kaiser |
| 11,390,194 B2 | 7/2022 | Maciejczyk |
| 11,760,238 B2 | 9/2023 | Maciejczyk |
| 2014/0117729 A1 | 5/2014 | Allen |
| 2020/0223331 A1 | 7/2020 | Mason |

(Continued)

OTHER PUBLICATIONS

Office Action (Non-Final Rejection) dated May 22, 2025 for U.S. Appl. No. 18/372,315 (pp. 1-6).

*Primary Examiner* — Justin V Lewis
(74) *Attorney, Agent, or Firm* — Barnes & Thornburg LLP

(57) ABSTRACT

A child restraint includes a seat bottom and a seat back coupled to the seat bottom. The seat back includes a backrest configured to extend upwardly from the seat bottom and a headrest coupled to the backrest for supporting a head of a child. The headrest includes a rear headrest wall, a first headrest side wall extending outwardly away from the rear headrest wall, and a second headrest side wall extending outwardly away from the rear headrest wall and away from the first headrest side wall.

20 Claims, 6 Drawing Sheets

(56) References Cited

U.S. PATENT DOCUMENTS

2022/0305974 A1   9/2022  Hsu
2025/0001916 A1   1/2025  Jake

* cited by examiner

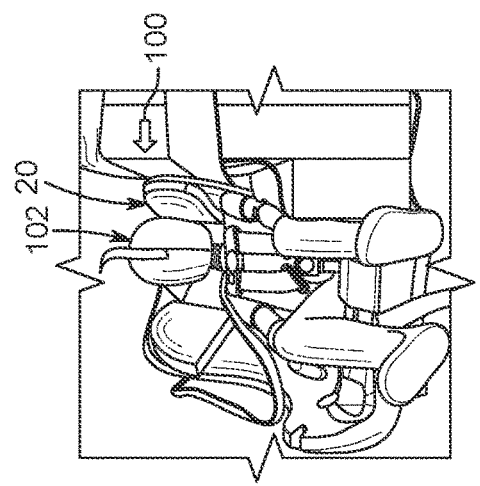
FIG. 6
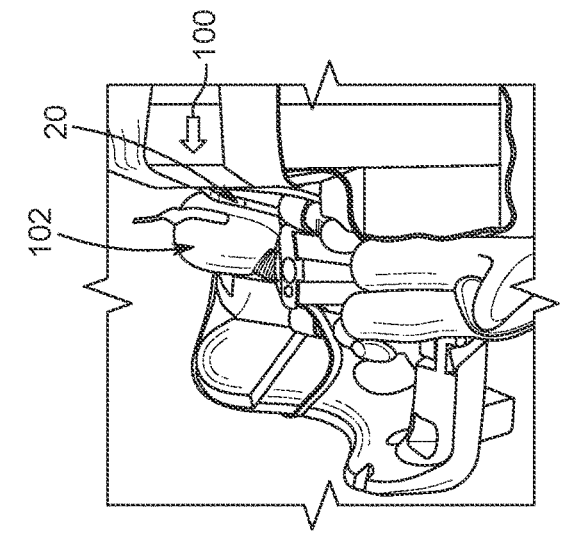
FIG. 7
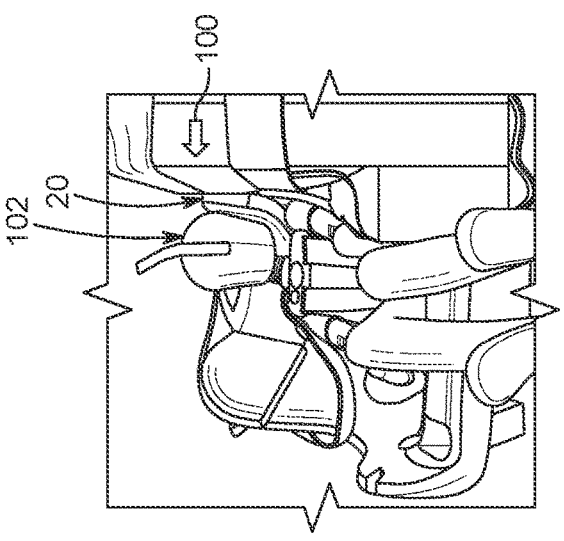
FIG. 8
FIG. 9

CHILD RESTRAINT

PRIORITY CLAIM

This application claims priority under 35 U.S.C. § 119(e) to U.S. Provisional Application Ser. No. 63/409,942, filed Sep. 26, 2022, which is expressly incorporated by reference herein.

BACKGROUND

The present disclosure relates to a child restraint, and particularly to a child restraint configured to be secured to a vehicle seat within a vehicle. More particularly, the present disclosure relates to a child restraint that is configured to reduce undesirable forces acting on a child in the child restraint during operation of vehicle.

SUMMARY

According to the present disclosure, a child restraint includes a seat bottom and a seat back coupled to the seat bottom. The seat back includes a backrest configured to extend upwardly from the seat bottom and a headrest coupled to the backrest for supporting a head of a child. The headrest includes a rear headrest wall arranged along a forward-facing surface of the backrest, a first headrest side wall extending outwardly away from the rear headrest wall, and a second headrest side wall extending outwardly away from the rear headrest wall and away from the first headrest side wall.

In illustrative embodiments, the child restraint further includes energy-redirection means coupled to the first and second headrest side walls. The energy-redirection means is configured to redirect at least a portion of a cumulative force from the head of the child during an impact event into at least a first force extending into one of the first and second headrest side walls and a second force extending outwardly away from the rear headrest wall of the headrest so that the head of the child does not experience the cumulative force when impacting the one of the first and second headrest side walls. The first and second forces are each less than the cumulative force as a result of the head of child interacting with the energy-redirection means.

In illustrative embodiments, the energy-redirection means includes a head-movement controller coupled to, or providing a part of, each headrest side wall and configured to guide the head of the child during the lateral impact event to reduce forces experienced by the child. During a lateral impact event, the head-movement controller causes the head of the child to roll across the one of the headrest side walls and to maintain contact with the headrest side wall for a longer period of time and/or distance during the lateral impact event. This disperses forces acting on the head of the child over a greater area and longer period of time thereby reducing the potential for a cumulative force acting on the child's head that may injure the child.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 3:
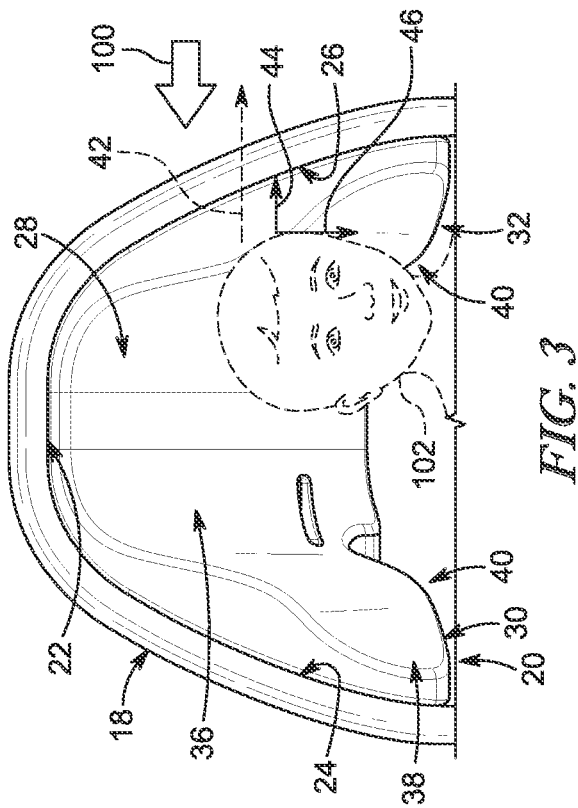
Figure 1:
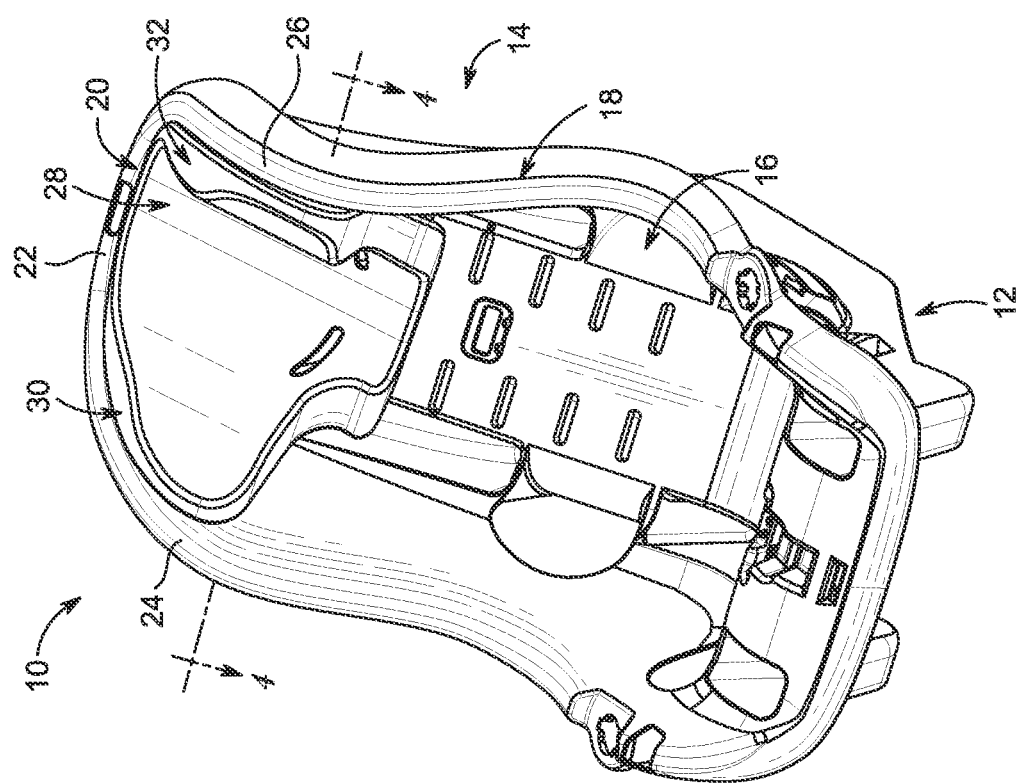
FIG. 1 is a perspective view of a child restraint, in accordance with the present disclosure, including a seat bottom and a seat back coupled to the seat bottom, the seat back including a backrest and a headrest having a head-movement controller configured to reduce a magnitude of one or more forces experienced by an occupant of the child restraint during a lateral impact event.
Figure 4:
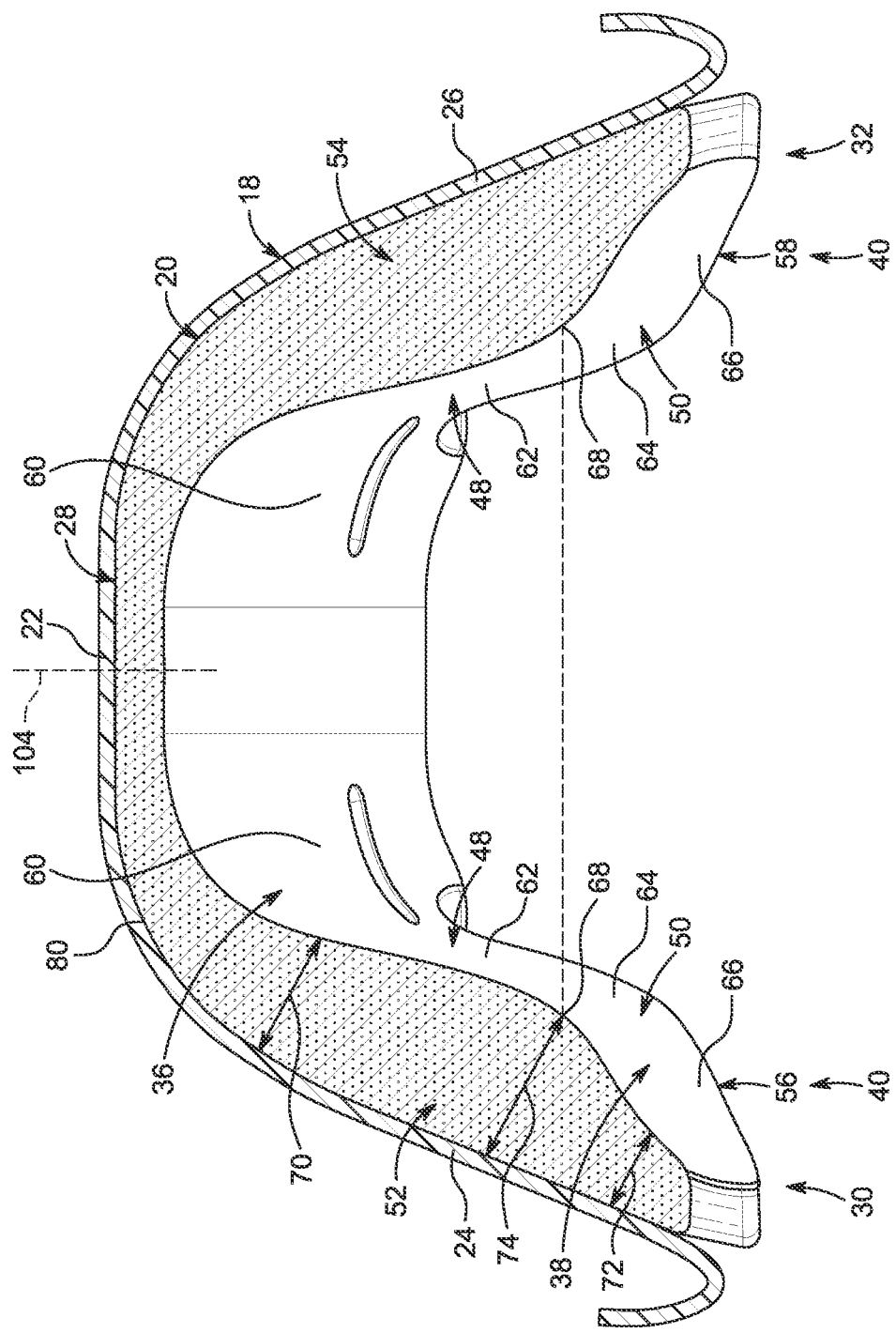
Figure 5:
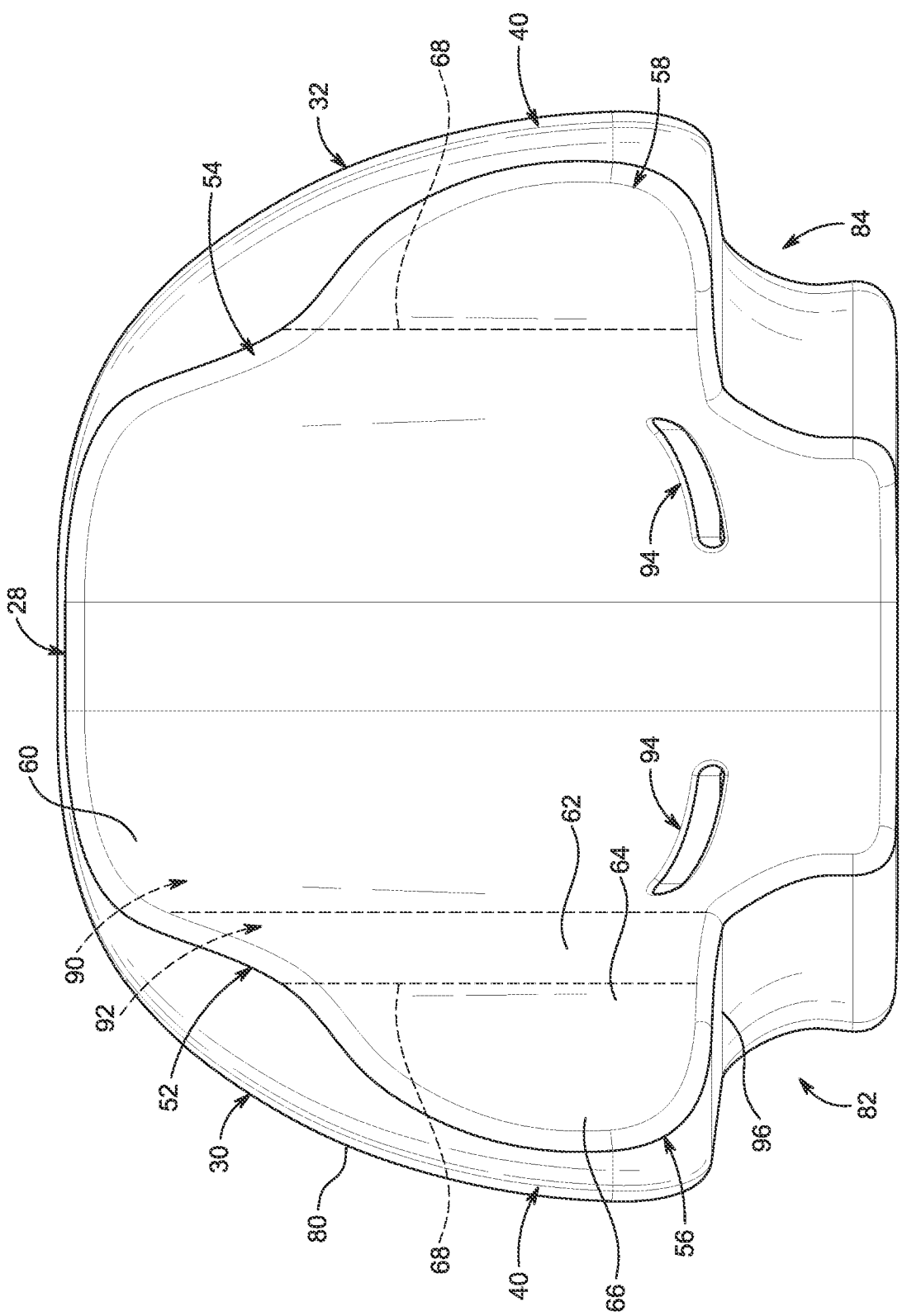
Figure 10:
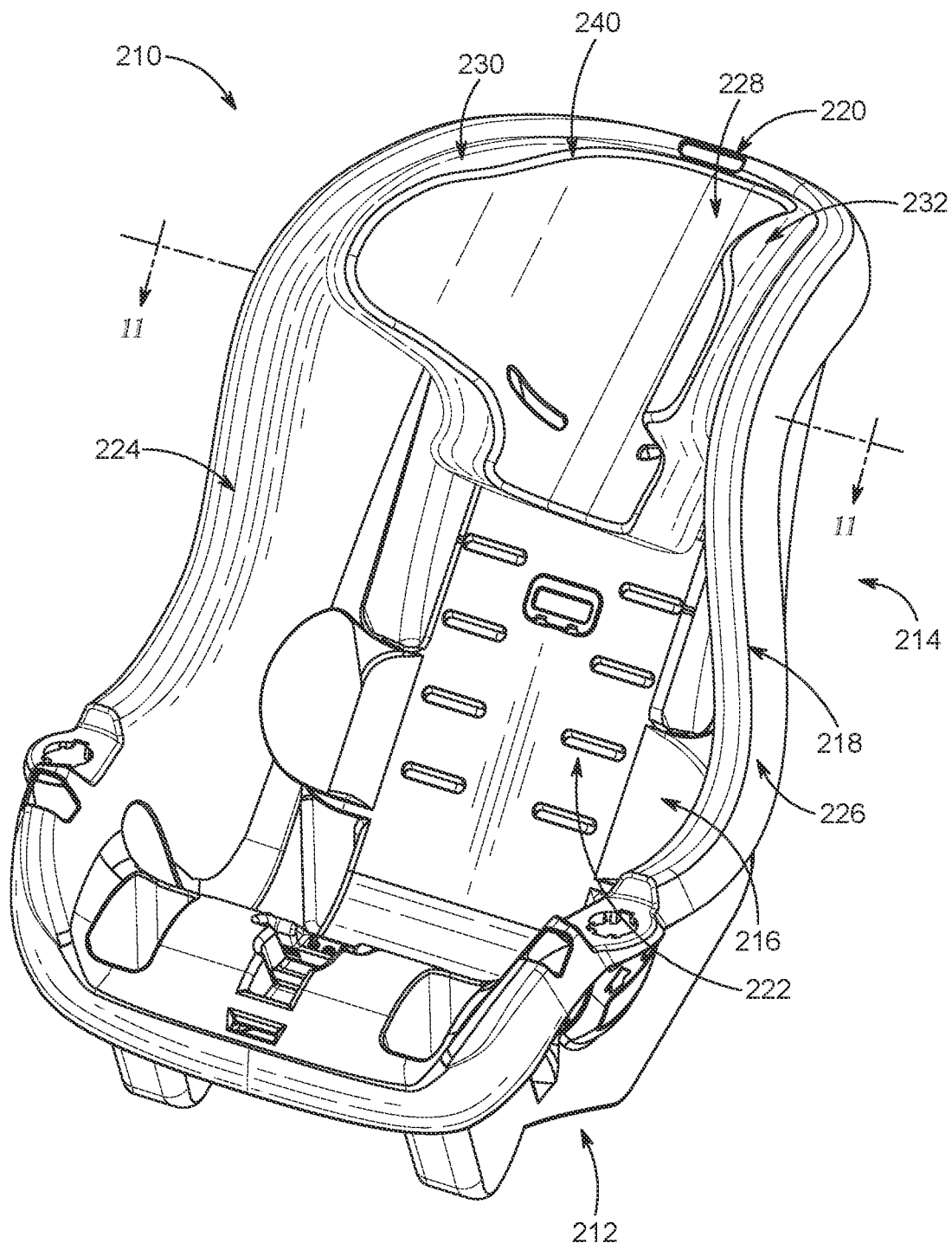
Figure 11:
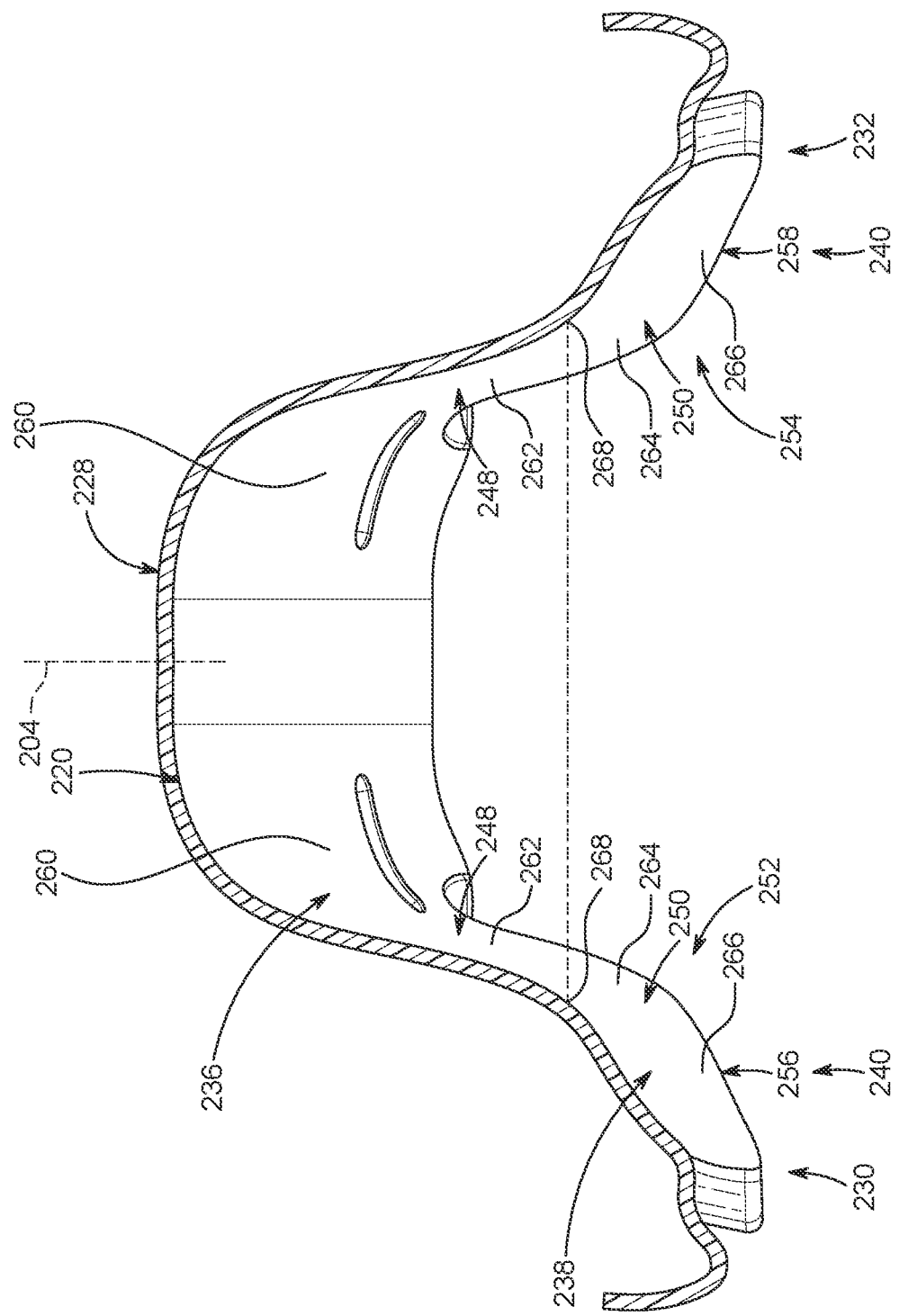

FIG. 3 is a top perspective view of the headrest shown in FIG. 1 during a lateral impact event showing the occupant's head (in phantom) interacting with the head-movement controller and suggesting that the head does not experience a potential, cumulative force and instead experiences, at least, a first force extending into a side wall of the headrest and a second force extending outwardly away from the headrest, each of the first and second forces having a magnitude less than the potential, cumulative force;

FIG. 4 is a sectional view taken along line 4-4 of FIG. 1 showing that the headrest includes opposing head-support panels and opposing energy-redirection tips defined by various surfaces which provide energy-redirection means during the lateral impact event;

FIG. 5 is a front plane view of the headrest of FIGS. 1-4;

FIGS. 6-9 are a series of views showing a test dummy seated in a child restraint equipped with the headrest of FIGS. 1-5 and showing the child restraint and the test dummy experiencing a lateral impact test event that simulates a lateral impact event that could be felt by a child using the child restraint with the headrest shown in FIGS. 1-5;

FIG. 6 is a front view of the child restraint with the headrest of FIGS. 1-5 showing the child restraint and the test dummy prior to the lateral impact test event;

FIG. 7 is a front view of the child restraint with the headrest of FIGS. 1-5 showing the child restraint and the test dummy impacting a wall to initiate the lateral impact test event and showing a head of the test dummy impacting a side wall of the headrest;

FIG. 8 is a front view of the child restraint with the headrest of FIGS. 1-5 showing the head of the test dummy rolling along the side wall of the headrest as the lateral impact test event continues;

FIG. 9 is a front view of the child restraint with the headrest of FIGS. 1-5 showing the head of the test dummy rolling further along an energy-redirection zone of the headrest to increase an amount of time and distance the head is in contact with the side wall of the headrest during the lateral impact event so that the forces experienced by the head are distributed more efficiently across the side wall;

FIG. 10 is a perspective view of another child restraint, in accordance with the present disclosure, including a seat bottom and a seat back coupled to the seat bottom, the seat back including a backrest and a headrest having a head-movement controller configured to reduce a magnitude of one or more forces experienced by an occupant of the child restraint during a lateral impact event; and FIG. 11 is a cross section of the child restraint taken along line 11-11 in FIG. 10 showing that the headrest includes opposing head-support panels and opposing energy-redirection tips defined by various surfaces which provide energy-redirection means during the lateral impact event.

DETAILED DESCRIPTION

Figure 2:
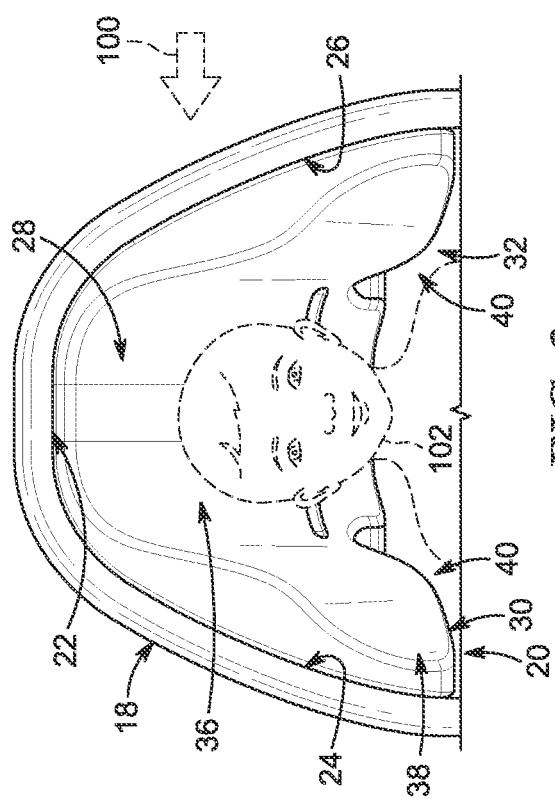
FIG. 2 is a top perspective view of the child restraint shown in FIG. 1 prior to a lateral impact event.

A child restraint 10 in accordance with the present disclosure is shown in FIGS. 1-3. A second embodiment of a child restraint 210 in accordance with the present disclosure is shown in FIGS. 10 and 11. The child restraints 10, 210 include a headrest 20, 220 having a head-movement controller 40, 240 as shown in FIGS. 1-11. The head-movement controller 40, 240 is configured to reduce a magnitude of forces experienced by a child seated on the child restraint 10, 210 by controlling movement of the child's head as the child's head contacts the child restraint 10, 210 during a lateral impact event 100.

The child restraint 10 includes a seat bottom 12 and a seat back 14 coupled to the seat bottom 12. The seat bottom 12 and the seat back 14 define a child-receiving space 16 to hold a child for transportation in a vehicle, for example. The seat back 14 includes a backrest 18 coupled to the seat bottom 12 and arranged to extend upwardly from the seat bottom 12 and the headrest 20 coupled to the backrest for supporting a head of the child.

The backrest 18 includes a rear backrest wall 22, a first backrest side wall 24, and a second backrest side wall 26 as shown in FIGS. 1-3. The headrest 20 may be secured to the rear backrest wall 22. The first and second backrest side walls 24, 26 extend forward away from the rear backrest wall 22 to define the child-receiving space 16 between the first and second backrest side walls 24, 26 and in front of the rear backrest wall 22.

The headrest 20 is coupled to the backrest 18 and is arranged to lie within the child-receiving space 16 for supporting a head of a child 102 seated in the child-receiving space 16 as suggested in FIGS. 2 and 3. The headrest 20 includes a rear headrest wall 28 arranged to extend along the rear backrest wall 22 of the backrest 18, a first headrest side wall 30 arranged to extend outwardly away from the rear headrest wall 28, and a second headrest side wall 32 arranged to extend outwardly away from the rear headrest wall. The first headrest side wall 30 extends along the first backrest side wall 24 while the second headrest side wall 32 extends along the second backrest side wall 26 opposite the first headrest side wall 30. The first and second headrest side walls 30, 32 establish a head-confinement space 36 between each of the headrest side walls 30, 32 and directly in front of the rear headrest wall 28 and an energy-redirection space 38 located forward of the head-confinement space 36.

Both of the headrest side walls 30, 32 include a head-movement controller 40 configured to provide means for guiding the head of the child 102 from the head-confinement space 36 to the energy-redirection space 38 in response to the head of the child 102 impacting one of the headrest side walls 30, 32 during a lateral impact event 100. The head-movement controller 40 causes the head of the child 102 to remain in contact with the one of the headrest side walls 30, 32 as the child's head 102 moves from the head-confinement space 36 to the energy-redirection space 38 during the lateral impact event 100. In particular, the head-movement controller 40 guides the child's head 102 to roll across the headrest side wall 30, 32 to the energy redirection space 38 and decelerate over a greater amount of time and distance than the child's head 102 would have without the head-movement controller 40.

The head-movement controller 40 is configured to cause a potential, cumulative force 42 from the head of the child 102 to divide or transform into at least a first force 44 extending into the one of the headrest side walls 30, 32 and a second force 46 extending outwardly away from the rear headrest wall 28. Thus, the head of the child 102 does not experience the potential, cumulative force 42 during the lateral impact event 100. The cumulative force 42 extends in the same direction as first force 44 and has a higher magnitude than first force 44 and second force 46. The first force 44 and the second force 46 may satisfy safety standards while cumulative force 42 would not have satisfied the same safety standards.

Both the first headrest side wall 30 and the second headrest side wall 32 include a head-confinement zone 48 coupled to the rear headrest wall 28 of the headrest 20 and an energy-redirection zone 50 coupled to the head-confinement zone 48 and spaced apart from the rear headrest wall 28 of the headrest 20 as shown in FIGS. 2-4. The head-confinement zone 48 is provided by opposing head-support panels 52, 54 which cooperate with the rear headrest wall 28 to define the head-confinement space 36 and provide a boundary for the child's head prior to the lateral impact vent. The energy-redirection zone 50 is provided by opposing energy-redirection tips 56, 58 coupled to distal ends of each corresponding head-support panel 50, 52 and which cooperate to define the energy-redirection space 38 therebetween.

The head-confinement zone 48 is defined at least partially by a first concavely-shaped surface 60 and a first convexly-shaped surface 62 each facing toward the head of the child as shown in FIG. 4. The first concavely-shaped surface 60 is coupled to the rear headrest wall 28 and extends outwardly away from the rear headrest wall 28. The first convexly-shaped surface 62 is coupled to an end of the concavely-shaped surface 60 spaced apart from the rear headrest wall 28 and extends outwardly away from the first concavely-shaped surface 60.

The energy-redirection zone 50 is defined at least partially by a second convexly-shaped surface 64 and a second concavely-shaped surface 66 that each face toward the energy-redirection space 38 as shown in FIG. 4. The second convexly-shaped surface 64 is coupled to an end of the first convexly-shaped surface 62 spaced apart from first concavely-shaped surface 60. The second concavely-shaped surface 66 is coupled to an end of the second convexly-shaped surface 64 spaced apart from the first convexly-shaped surface 62. The second convexly-shaped surface 64 and the second-concavely-shaped surface 66 cooperate to guide movement of the child's head to roll off of the head-confinement zone 48 and onto to energy-redirection zone 50 during an impact event 100. The first and second convexly-shaped surfaces 62, 64 are joined to one another at a junction 68. The junction 68 occurs at an apex between each convexly-shaped surface 62, 64 and defines a boundary between the head-confinement space 36 and the energy-redirection space 38, between the head-confinement zone 48 and the energy-redirection zone 50, and between the head-support panels 52, 54 and each respective energy-redirection tip 56, 58.

The first concavely-shaped surface 60 and the first convexly-shaped surface 62 cooperate to block substantial movement of the child's head away from a centerline 104 of the child restraint 10 when the child's head is in the head-confinement space 36. The energy-redirection zone 50 causes the child's head to continue rolling along the head-confinement zone 48 without bouncing off of the headrest 20. This increases an amount of time and distance the child's head is in contact with the headrest 20 during the impact event 100 to distribute forces across a greater surface area of the headrest 20 and decrease a magnitude of the forces experienced by the child.

Each headrest side wall 30, 32 varies in thickness from the rear headrest wall 28 to a distal end of each energy-redirection tip 56, 58 as shown in FIG. 4. Each headrest side wall 30, 32 has a first thickness 70 at the first convexly-shaped surface 62 and a second thickness at the second concavely-shaped surface 66. The first thickness 70 is greater than the second thickness 72. Each headrest side wall 30, 32 has a third thickness 74 at the junction 68 between the first convexly-shaped surface 62 the second convexly-shaped surface 64. The third thickness 74 is greater than the first thickness 70 and the second thickness 72. The third thickness 74 is the greatest thickness in the headrest 20 in some embodiments.

The first and second thicknesses 70, 72 may vary gradually as they extend toward and away from the junction 68. In some embodiments, the first thickness 70 varies at a smaller rate than the second thickness 72 such that the first convexly-shaped surface 62 has a smaller slope/rate of change than the second convexly-shaped surface 64. In some embodiments, the first convexly-shaped surface 62 has a first curvature over a first distance and the second convexly-shaped surface 64 has a second curvature of a second distance. The first curvature and the first distance are greater than the second curvature and the second distance.

In some embodiments, the backrest 18 and headrest 20 may deform under load caused by the lateral impact event 100 as shown in FIGS. 6-9. The energy redirection tips 56, 58 are positioned further from the centerline 104 of the child restraint 10 than the head-support panels 52, 54. One of the headrest side walls 30, 32 may bend inward toward the centerline 104 during the impact event. The child's head may contact a head-support panel 52, 54 first, and is then subsequently guided toward an energy-redirection tip 56, 58. Since the energy-redirection tips 56, 58 are spaced further from the centerline 104, the child's head may reach the energy redirection tip 56, 58 in the time it take for the energy redirection tips 56, 58 to deflect inwardly. Thus, the position of the energy-redirection tips 56, 58 may allow the headrest 20 to deform relative to the child's head while the child's head is guided along surfaces 60 62, 64, 66. Thus, the shape of the surfaces 60, 62, 64, 66 provided by each headrest side wall 30, 32 helps to maintain contact between the child's head and a headrest side wall 30, 32 without urging the child's head toward the centerline 104 in response to any deflection of the headrest side wall 30, 32 toward the centerline 104 during the impact event.

The headrest 20 may be an insert that is fitted between the backrest 18 and an outer trim (not shown) of the headrest 20. The child restraint 10 may be retrofitted with the headrest 20 such that the headrest 20 is placed over an existing headrest included in the child restraint 10. In some embodiments, the headrest 20 may further include a layer of cushioning material (i.e. a compressible foam, soft goods, etc.) between the outer trim and the headrest 20.

Each headrest 20 is formed from a material (i.e. a plastic or foam, such as, expanded polyethylene (EPE), expanded polypropylene (EPP), porous expanded polypropylene (P-EPP), cross-linked expanded polyethylene (xEPE), etc.) that does not collapse or compress substantially during an impact event so that the head of the child rolls along outer surfaces 60, 62, 64, 66 of the headrest side walls 30, 32 during the impact event. Thus, the headrest 20 substantially maintains its shape during the impact event to control movement of the child's head during the impact event. In some embodiments, the headrest 20 also does not include any side impact air bags which tend to compress with load and may not direct the head of the child to roll along the outer surfaces 60, 62, 64, 66. The headrest 20 has a rear surface 80 which extends along the rear backrest wall 22, the first backrest side wall 24, and the second backrest side wall 26. The rear surface 80 matches a contour of the backrest 18 so that loads bearing on headrest 20 from the child do not cause substantial movement of headrest 20 relative to the backrest 18. In some embodiments, only a majority (i.e. greater than 50%) of the rear surface 80 matches and is in contact with the backrest 18.

The rear surface 80 extends outwardly away from centerline 104 from an upper end of the headrest 20 to a lower end of the headrest 20 as shown in FIG. 5. The first and second headrest side walls 30, 32 are each formed to include a shoulder-receiving space 82, 84 at a lower end thereof. The rear headrest wall 28 has a first height and each of the headrest side walls 30, 32 has a second height less than the first height. In some embodiments, a first portion 90 of each head-support panel 52, 54 has the first height and a second portion 92 of each head-support panel 52, 54 has the second height.

The rear headrest wall 28 and the first portion 90 of each head-support panel are formed to include a belt-receiving slot 94 that extends through the headrest 20. At least a portion of each belt-receiving slot 94 is aligned with a bottom surface 96 of the second portion 92 of each head-support panel 52, 54.

The headrest 20 may have the following properties and/or characteristics shown in Table 1.

TABLE 1

| Physical Property | Unit | EPE | | | | | EPP | | | xEPE | P-EPP |
|---|---|---|---|---|---|---|---|---|---|---|---|
| Average Density | pcd | 1 | 1.3 | 1.5 | 1.9 | 2.8 | 1 | 1.3 | 1.9 | 2.8 | 1.5 | 2.8 |
| Compression Strength @ 25% | psi | 8 | 10 | 11 | 13 | 22 | 11 | 14.5 | 23.5 | 42 | 6 | 23 |
| Compression Strength @ 50% | psi | 16 | 18 | 19 | 22 | 35 | 19 | 23.5 | 33.5 | 54 | 15 | 35 |
| Compression Strength @ 75% | psi | 38 | 44 | 49 | 56 | 75 | 41 | 45 | 64 | 111 | 40 | 79 |
| Tensile Strength | % | 39 | 40 | 45 | 52 | 70 | 35 | 38 | 55.5 | 67 | 22 | 27 |
| Tensile Elongation | lbs/in | 38 | 32 | 30 | 29 | 25 | 18 | 16 | 15 | 14 | 50 | 13 |
| Tear Strength | % | 12 | 14 | 16 | 17 | 21 | 9 | 10 | 13 | 16 | 12 | 19 |

TABLE 1-continued

| Physical Property | Unit | EPE | | | | | EPP | | | | xEPE | P-EPP |
|---|---|---|---|---|---|---|---|---|---|---|---|---|
| Comp Set @ 25% | % | 3 | 3 | 4 | 4 | 4 | 8 | 8 | 7 | 7 | 2 | 5 |
| Comp Set @ 50% | % | 12 | 14 | 13 | 12 | 12 | 16 | 14 | 12 | 12 | 6 | 9 |
| Buoyancy | pcf | 61.2 | 60.6 | 59.5 | 59.5 | 59.1 | 61 | 60.5 | 59.5 | 59 | 61 | n/a |
| Thermal Conductivity | (K) BTU-in/ft-hr-f | 0.26 | 0.26 | 0.24 | 0.24 | 0.24 | 0.24 | 0.24 | 0.24 | 0.24 | 0.25 | 0.265 |
| Thermal Resistance | (R) @ 70 F. | 3.9 | 4 | 4.2 | 4.2 | 4.2 | 4.2 | 4.2 | 4.2 | 4.2 | 4 | 3.8 |
| Service Temp | F | 160 | 160 | 160 | 160 | 160 | 212 | 212 | 212 | 212 | 185 | 212 |
| Water Absorption | % | −1 | −1 | −1 | −1 | −1 | −1 | −1 | −1 | −1 | −1 | −1 |
| Compression Creep | 1000 hr @ 1 psi | 2.5 | 3 | 3 | 3.3 | 3 | n/a | n/a | n/a | n/a | n/a | n/a |

The properties and/or characteristics in Table 1 above were calculated using the test methods shown in Table 2 at the time of filing this patent application.

TABLE 2

| Physical Property | Test Method |
|---|---|
| Average Density | ASTM-D3575 |
| Comp Strength @ 25% | ASTM-D3575 |
| Comp Strength @ 50% | ASTM-D3575 |
| Comp Strength @ 75% | ASTM-D3575 |
| Tensile Strength | ASTM-D3575 |
| Tensile Elongation | ASTM-D3575 |
| Tear Strength | ASTM-D3575 |
| Comp Set @ 25% | ASTM-D3575 |
| Comp Set @ 50% | ASTM-D3575 |
| Buoyancy | ASTM-D3575 |
| Thermal Conductivity | ASTM-C177 |
| Thermal Resistance | ASTM-C178 |
| Service Temp | ASTM-D3575 |
| Water Absorption | ASTM-D3575 |
| Comp Creep | ASTM-D3575 |

Each of the materials shown in Table 1 also passed a Flammabilty test according to test method FMVSS-302. Each of the materials shown in Table 1 also passed a Fuel Immersion test according to test method Coast Guard (CGD-770145) Fuel B.

The child restraint 10 was tested in a side impact simulator to determine head injury criterion of a child during a lateral impact event. Some child restraints having a headrest without head-movement controller 40 received a Head Injury Criterion (HIC) score of about 700. Unexpectedly, including head-movement controller 40 decreased the HIC score. In one example, the HIC score of headrest 20 was less than 600. In one example, the HIC score of headrest 20 was less than 550. In one example, the HIC score of headrest 20 was less than 540. In one example, the HIC score of headrest 20 was less than 530. In one example, the HIC score of headrest 20 was less than 520. In one example, the HIC score of headrest 20 was less than 510. In one example, the HIC score of headrest 20 was less than 500. In one example, the HIC score of headrest 20 was less than 490. In one example, the HIC score of headrest 20 was less than 480. In one example, the HIC score of headrest 20 was less than 470. In one example, the HIC score of headrest 20 was less than 460. In one example, the HIC score of headrest 20 was less than 450. In one example, the HIC score of headrest 20 was less than 440. In one example, the HIC score of headrest 20 was less than 430. In one example, the HIC score of headrest 20 was less than 420. In one example, the HIC score of headrest 20 was less than 410. In one example, the HIC score of headrest 20 was less than 400. In one example, the HIC score of headrest 20 was less than 390. In one example, the HIC score of headrest 20 was less than 380. In one example, the HIC score of headrest 20 was less than 370. In one example, the HIC score of headrest 20 was less than 360. In one example, the HIC score of headrest 20 was less than 350. In one example, the HIC score of headrest 20 was less than 340. In one example, the HIC score of headrest 20 was less than 330. In one example, the HIC score of headrest 20 was less than 320. In one example, the HIC score of headrest 20 was less than 310. In one example, the HIC score of headrest 20 was less than 300. In one example, the HIC score of headrest 20 was less than 275. In one example, the HIC score of headrest 20 was less than 250.

Another embodiment of a child restraint 210 including a headrest 220 made from a rigid plastic material is shown in FIGS. 10 and 11. The child restraint 210 includes a seat bottom 212 and a seat back 214 coupled to the seat bottom 212. The seat bottom 212 and the seat back 214 define a child-receiving space 216 to hold a child for transportation in a vehicle, for example. The seat back 214 includes a backrest 218 coupled to the seat bottom 212 and arranged to extend upwardly from the seat bottom 212 and the headrest 220 coupled to an upper end of the backrest 218 for supporting a head of the child.

The backrest 218 includes a rear backrest wall 222, a first backrest side wall 224, and a second backrest side wall 226 as shown in FIGS. 10 and 11. The headrest 220 may be integrated with or secured to the rear backrest wall 222 and/or the backrest side walls 224, 226. The headrest 220 is configured to partially define the child-receiving space 216 with the backrest 216. The headrest 220 includes a rear headrest wall 228, a first headrest side wall 230, and a second headrest side wall 232. The first and second headrest side walls 230, 232 establish a head-confinement space 236 between each of the headrest side walls 230, 232 and an energy-redirection space 238 located forward of the head-confinement space 236.

Both of the headrest side walls 230, 232 include a head-movement controller 240 configured to provide means for guiding the head of the child 102 from the head-confinement space 236 to the energy-redirection space 238 in response to the head of the child 102 impacting one of the headrest side walls 230, 232 during a lateral impact event 100. The head-movement controller 240 causes the head of the child 102 to remain in contact with the one of the headrest side walls 230, 232 as the child's head 102 moves from the head-confinement space 236 to the energy-redirection space 238 during the lateral impact event 100. In particular, the head-movement controller 240 guides the child's head 102 to roll across the headrest side wall 230, 232 to the energy redirection space 238 and decelerate over a greater amount of time and distance than the child's head 102 would have without the head-movement controller 240. Disclosure related to head-movement controller 40 herein is hereby incorporated by reference for head-movement controller 240.

Both the first headrest side wall 230 and the second headrest side wall 232 include a head-confinement zone 248 coupled to the rear headrest wall 228 of the headrest 220 and an energy-redirection zone 250 coupled to the head-confinement zone 248 and spaced apart from the rear headrest wall 228 of the headrest 220 as shown in FIGS. 10 and 11. The head-confinement zone 248 is provided by opposing head-support panels 252, 254 which cooperate with the rear headrest wall 228 to define the head-confinement space 236 and provide a boundary for the child's head prior to the lateral impact vent. The energy-redirection zone 250 is provided by opposing energy-redirection tips 256, 258 coupled to distal ends of each corresponding head-support panel 250, 252 and which cooperate to define the energy-redirection space 238 therebetween.

The head-confinement zone 248 is defined at least partially by a first concavely-shaped surface 260 and a first convexly-shaped surface 262 each facing toward the head of the child as shown in FIG. 11. The first concavely-shaped surface 260 is coupled to the rear headrest wall 228 and extends outwardly away from the rear headrest wall 228. The first convexly-shaped surface 262 is coupled to an end of the concavely-shaped surface 260 spaced apart from the rear headrest wall 228 and extends outwardly away from the first concavely-shaped surface 260.

The energy-redirection zone 250 is defined at least partially by a second convexly-shaped surface 264 and a second concavely-shaped surface 266 that each face toward the energy-redirection space 238 as shown in FIG. 11. The second convexly-shaped surface 264 is coupled to an end of the first convexly-shaped surface 262 spaced apart from first concavely-shaped surface 260. The second concavely-shaped surface 266 is coupled to an end of the second convexly-shaped surface 264 spaced apart from the first convexly-shaped surface 262. The second convexly-shaped surface 264 and the second-concavely-shaped surface 266 cooperate to guide movement of the child's head to roll off of the head-confinement zone 248 and onto to energy-redirection zone 250 during an impact event 100. The first and second convexly-shaped surfaces 262, 264 are joined to one another at a junction 268. The junction 268 occurs at an apex between each convexly-shaped surface 262, 264 and defines a boundary between the head-confinement space 236 and the energy-redirection space 238, between the head-confinement zone 248 and the energy-redirection zone 50, and between the head-support panels 252, 254 and each respective energy-redirection tip 256, 258.

The first concavely-shaped surface 260 and the first convexly-shaped surface 262 cooperate to block substantial movement of the child's head away from a centerline 204 of the child restraint 210 when the child's head is in the head-confinement space 236. The energy-redirection zone 250 causes the child's head to continue rolling along the head-confinement zone 248 without bouncing off of the headrest 220. This increases an amount of time and distance the child's head is in contact with the headrest 220 during the impact event 100 to distribute forces across a greater surface area of the headrest 220 and decrease a magnitude of the forces experienced by the child.

The invention claimed is:

1. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend away from the rear backrest wall to define a child-receiving space between the first and second backrest side walls and in front of the rear backrest wall, and
a headrest coupled to the backrest and arranged to lie within the child-receiving space for supporting a head of a child seated in the child-receiving space, the headrest including a rear headrest wall arranged to extend along the rear backrest wall of the backrest, a first headrest side wall arranged to extend outwardly away from the rear headrest wall and along the first backrest side wall, and a second headrest side wall arranged to extend outwardly away from the rear headrest wall and along the second backrest side wall, the headrest side walls establish a head-confinement space between each of the headrest side walls and an energy-redirection space located forward of the head-confinement space
wherein the first and second headrest side walls includes a head-movement controller configured to provide means for guiding the head of the child from the head-confinement space to the energy-redirection space in response to the head of the child impacting one of the headrest side walls during a lateral impact event while the head of the child remains in contact with the one of the headrest side walls and moves from the head-confinement space to the energy-redirection space during the lateral impact event so that a potential, cumulative force from the head of the child is transformed into at least a first force extending into the one of the headrest side walls and a second force extending outwardly away from the rear headrest wall and the head of the child does not experience the potential, cumulative force and a Head Injury Criterion (HIC) score is minimized,
wherein the head-confinement space is defined at least partially by a first convexly-shaped surface that faces toward the head of the child, and the energy-redirection space is defined at least partially by a first concavely-shaped surface that faces toward the head of the child, and
wherein the head-confinement space is partially defined by a second concavely-shaped surface coupled to the rear headrest wall to locate the first convexly-shaped surface between the first concavely-shaped surface and the second concavely-shaped surface of each headrest side wall.

2. The child-restraint of claim 1, wherein the energy-redirection space is partially defined by a second convexly-shaped surface coupled to the first convexly-shaped surface to locate the second convexly-shaped surface between the first concavely-shaped surface and the first convexly-shaped surface.

3. The child restraint of claim 2, wherein each headrest side wall has a first thickness at the first convexly-shaped surface and a second thickness at the first concavely-shaped surface, the first thickness is greater than the second thickness, wherein the first and second thicknesses are defined between an inner surface of the headrest facing toward the child-receiving space and an outer surface of the headrest facing away from the child-receiving space.

4. The child restraint of claim 3, wherein each headrest side wall has a third thickness at a junction between the first convexly-shaped surface the second convexly-shaped surface, the third thickness is greater than the first thickness and the second thickness, wherein the third thickness is defined between the inner surface of the headrest facing toward the child-receiving space and the outer surface of the headrest facing away from the child-receiving space.

5. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend away from the rear backrest wall to define a child-receiving space between the first and second backrest side walls and in front of the rear backrest wall, and
a headrest coupled to the backrest for supporting a head of a child seated in the child-receiving space, the headrest including a rear headrest wall, a first headrest side wall arranged to extend outwardly away from the rear headrest wall, and a second headrest side wall arranged to extend outwardly away from the rear headrest wall,
wherein both the first headrest side wall and the second headrest side wall include a head-confinement zone coupled to the rear headrest wall of the headrest and an energy-redirection zone coupled to the head-confinement zone and spaced apart from the rear headrest wall of the headrest,
wherein the head-confinement zone of each headrest side wall is defined at least partially by a convexly-shaped surface that faces toward the head of the child, and the energy-redirection zone is defined at least partially by a concavely-shaped surface that faces toward the head of the child,
wherein each headrest side wall transitions from the head-confinement zone to the energy-redirection zone midway between a rear end of each headrest side wall and a forward end of each headrest side wall, and
wherein the head-confinement zone is partially defined by a second concavely-shaped surface coupled to the rear headrest wall to locate the convexly-shaped surface of the head-confinement zone between the concavely-shaped surface of the energy-redirection zone and the second concavely-shaped surface of the head-confinement zone.

6. The child-restraint of claim 5, wherein the energy-redirection zone is partially defined by a second convexly-shaped surface coupled to the convexly-shaped surface of the head-confinement zone to locate the second convexly-shaped surface between the concavely-shaped surface of the energy-redirection zone and the convexly-shaped surface of the head-confinement zone.

7. The child restraint of claim 5, wherein the headrest is coupled to an upper end of the backrest and/or forms the upper end of the backrest.

8. The child restraint of claim 5, wherein each headrest side wall has a first thickness in the head-confinement zone and a second thickness in the energy-redirection zone, the first thickness is greater than the second thickness, wherein the first and second thicknesses are defined between an inner surface of the headrest facing toward the child-receiving space and an outer surface of the headrest facing away from the child-receiving space.

9. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend away from the rear backrest wall to define a child-receiving space between the first and second backrest side walls and in front of the rear backrest wall, and
a headrest coupled to the backrest for supporting a head of a child seated in the child-receiving space, the headrest including a rear headrest wall, a first headrest side wall arranged to extend outwardly away from the rear headrest wall, and a second headrest side wall arranged to extend outwardly away from the rear headrest wall,
wherein both the first headrest side wall and the second headrest side wall include a head-confinement zone coupled to the rear headrest wall of the headrest and an energy-redirection zone coupled to the head-confinement zone and spaced apart from the rear headrest wall of the headrest,
wherein the head-confinement zone of each headrest side wall is defined at least partially by a convexly-shaped surface that faces toward the head of the child, and the energy-redirection zone is defined at least partially by a concavely-shaped surface that faces toward the head of the child, and
wherein each headrest side wall has a first thickness in the head-confinement zone and a second thickness in the energy-redirection zone, the first thickness is greater than the second thickness, wherein the first and second thicknesses are defined between an inner surface of the headrest facing toward the child-receiving space and an outer surface of the headrest facing away from the child-receiving space.

10. The child restraint of claim 9, wherein each headrest side wall has a third thickness at a junction between the head-confinement zone and the energy-redirection zone, the third thickness is greater than the first thickness and the second thickness, wherein the third thickness is defined between the inner surface of the headrest facing toward the child-receiving space and the outer surface of the headrest facing away from the child-receiving space.

11. A child restraint comprising
a seat bottom adapted to rest on a vehicle seat,
a backrest coupled to the seat bottom and arranged to extend upwardly away from the seat bottom, the backrest including a rear backrest wall, a first backrest side wall, and a second backrest side wall, the first and second backrest side walls extend away from the rear backrest wall to define a child-receiving space between the first and second backrest side walls and in front of the rear backrest wall, and
a headrest coupled to the backrest for supporting a head of a child seated in the child-receiving space, the headrest including a rear headrest wall, a first headrest side wall arranged to extend outwardly away from the rear headrest wall, and a second headrest side wall arranged to extend outwardly away from the rear headrest wall, wherein both the first headrest side wall and the second headrest side wall include a head-confinement zone coupled to the rear headrest wall of the headrest and an energy-redirection zone coupled to the head-confinement zone and spaced apart from the rear headrest wall of the headrest, wherein the head-confinement zone of each headrest side wall is defined at least partially by a convexly-shaped surface that faces toward the head of the child, and the energy-redirection zone is defined at least partially by a concavely-shaped surface that faces toward the head of the child, and wherein the headrest is movable relative to the backrest to change a height of the headrest relative to the backrest.

12. The child restraint of claim 11, wherein the head-confinement zone is partially defined by a second concavely-shaped surface coupled to the rear headrest wall to locate the convexly-shaped surface of the head-confinement zone between the concavely-shaped surface of the energy-redirection zone and the second concavely-shaped surface of the head-confinement zone.

13. The child restraint of claim 11, wherein each headrest side wall has a first thickness in the head-confinement zone and a second thickness in the energy-redirection zone, the first thickness is greater than the second thickness, wherein the first and second thicknesses are defined between an inner surface of the headrest facing toward the child-receiving space and an outer surface of the headrest facing away from the child-receiving space.

14. The child restraint of claim 11, wherein a majority of a rear surface of the headrest is in contact with a forward surface of the backrest facing toward the rear surface.

15. The child restraint of claim 11, wherein the first and second headrest side walls are each formed to include a shoulder-receiving space at a lower end thereof such that the rear headrest wall has a first height and each of the headrest side walls has a second height less than the first height, and wherein a first portion of each head-support panel has the first height and a second portion of each head-support panel has the second height.

16. A child restraint comprising a seat bottom adapted to rest on a vehicle seat, a backrest coupled to the seat bottom and arranged to extend upwardly away from the seat bottom, the backrest including a rear backrest wall, a first backrest side wall, and a second backrest side wall, the first and second backrest side walls extend away from the rear backrest wall to define a child-receiving space between the first and second backrest side walls and in front of the rear backrest wall, and a headrest coupled to the backrest and arranged to lie within the child-receiving space for supporting a head of a child seated in the child-receiving space, the headrest including a rear headrest wall, a first headrest side wall arranged to extend outwardly away from the rear headrest wall, and a second headrest side wall arranged to extend outwardly away from the rear headrest wall, wherein both the first headrest side wall and the second headrest side wall include a head-support panel coupled to the rear headrest wall of the headrest and an energy-redirection tip coupled to the head-support panel and spaced apart from the rear headrest wall of the headrest, the energy-redirection tip has a surface that is configured to engage the head of the child during a lateral impact event and to guide movement of the head of the child away from the head-support panel while maintaining contact with the energy-redirection tip, and wherein a majority of a rear surface of the headrest is in contact with a forward surface of the backrest facing toward the rear surface.

17. The child restraint of claim 16, wherein the head-support panel of each headrest side wall is defined at least partially by a convexly-shaped surface that faces toward the head of the child, and the energy-redirection tip is defined at least partially by a concavely-shaped surface that faces toward the head of the child.

18. The child restraint of claim 16, wherein the rear surface extends outwardly away from the child receiving space from an upper end of the headrest to a lower end of the headrest.

19. A child restraint comprising a seat bottom adapted to rest on a vehicle seat, a backrest coupled to the seat bottom and arranged to extend upwardly away from the seat bottom, the backrest including a rear backrest wall, a first backrest side wall, and a second backrest side wall, the first and second backrest side walls extend away from the rear backrest wall to define a child-receiving space between the first and second backrest side walls and in front of the rear backrest wall, and a headrest coupled to the backrest and arranged to lie within the child-receiving space for supporting a head of a child seated in the child-receiving space, the headrest including a rear headrest wall, a first headrest side wall arranged to extend outwardly away from the rear headrest wall, and a second headrest side wall arranged to extend outwardly away from the rear headrest wall, wherein both the first headrest side wall and the second headrest side wall include a head-support panel coupled to the rear headrest wall of the headrest and an energy-redirection tip coupled to the head-support panel and spaced apart from the rear headrest wall of the headrest, the energy-redirection tip has a surface that is configured to engage the head of the child during a lateral impact event and to guide movement of the head of the child away from the head-support panel while maintaining contact with the energy-redirection tip, and wherein the first and second headrest side walls are each formed to include a shoulder-receiving space at a lower end thereof such that the rear headrest wall has a first height and each of the headrest side walls has a second height less than the first height, and wherein a first portion of each head-support panel has the first height and a second portion of each head-support panel has the second height.

20. The child restraint of claim 19, wherein the rear headrest wall and the first portion of each head-support panel are formed to include a belt-receiving slot that extends through the headrest, and wherein at least a portion of each belt-receiving slot is aligned with a bottom surface of the second portion of each head-support panel.

* * * * *